United States Patent
Song et al.

(10) Patent No.: US 11,462,053 B2
(45) Date of Patent: Oct. 4, 2022

(54) NEURAL NETWORK-BASED VISUAL DETECTION AND TRACKING METHOD OF INSPECTION ROBOT

(71) Applicant: Chongqing University, Chongqing (CN)

(72) Inventors: Yongduan Song, Chongqing (CN); Li Huang, Chongqing (CN); Shilei Tan, Chongqing (CN); Junfeng Lai, Chongqing (CN); Huan Liu, Chongqing (CN); Ziqiang Jiang, Chongqing (CN); Jie Zhang, Chongqing (CN); Huan Chen, Chongqing (CN); Jiangyu Wu, Chongqing (CN); Hong Long, Chongqing (CN); Fang Hu, Chongqing (CN); Qin Hu, Chongqing (CN)

(73) Assignee: Chongqing University, Chongqing (CN)

( * ) Notice: Subject to any disclaimer, the term of this patent is extended or adjusted under 35 U.S.C. 154(b) by 0 days.

(21) Appl. No.: 17/349,170

(22) Filed: Jun. 16, 2021

(65) Prior Publication Data

US 2022/0180090 A1 Jun. 9, 2022

(30) Foreign Application Priority Data

Dec. 4, 2020 (CN) .......................... 202011409502.1

(51) Int. Cl.
*G06K 9/00* (2022.01)
*G06V 40/20* (2022.01)
(Continued)

(52) U.S. Cl.
CPC .............. *G06V 40/20* (2022.01); *B25J 9/163* (2013.01); *G06K 9/629* (2013.01); *G06T 7/248* (2017.01);
(Continued)

(58) Field of Classification Search
CPC ........ G06V 40/20; G06V 10/40; G06V 40/10; G06V 40/161; G06V 2201/07;
(Continued)

(56) References Cited

U.S. PATENT DOCUMENTS

10,898,999 B1 * 1/2021 Cohen .................... B25J 9/0003
2020/0167950 A1 * 5/2020 Kaneko .................. G06T 7/215
(Continued)

*Primary Examiner* — Dhaval V Patel
(74) *Attorney, Agent, or Firm* — Nields, Lemack & Frame, LLC (57) ABSTRACT

The present disclosure provides a neural network-based visual detection and tracking method of an inspection robot, which includes the following steps of: 1) acquiring environmental images of a dynamic background a movement process of the robot; 2) preprocessing the acquired images; 3) detecting human targets and specific behaviors in the images in the robot body, and saving the sizes, position information and features of the human targets with the specific behaviors; 4) controlling the orientation of a robot gimbal by using a target tracking algorithm to make sure that a specific target is always located at the central positions of the images; and 5) controlling the robot to move along with a tracked object. The neural network-based visual detection and tracking method of an inspection robot in the present disclosure has a quite high adaptive ability, achieves better detection and tracking effects on targets in a dynamic background scene.

8 Claims, 3 Drawing Sheets

(51) Int. Cl.

| | | |
|---|---|---|
| *G06T 7/73* | (2017.01) | |
| *G06T 7/50* | (2017.01) | |
| *G06T 7/246* | (2017.01) | |
| *H04N 5/232* | (2006.01) | |
| *G06V 40/10* | (2022.01) | |
| *G06V 10/40* | (2022.01) | |
| *G06V 40/16* | (2022.01) | |
| *B25J 9/16* | (2006.01) | |
| *G06K 9/62* | (2022.01) | |

(52) U.S. Cl.
CPC ................. *G06T 7/50* (2017.01); *G06T 7/74* (2017.01); *G06V 10/40* (2022.01); *G06V 40/10* (2022.01); *G06V 40/161* (2022.01); *H04N 5/23299* (2018.08); *G06T 2207/10016* (2013.01); *G06T 2207/10024* (2013.01); *G06T 2207/20056* (2013.01); *G06T 2207/20084* (2013.01); *G06T 2207/30201* (2013.01); *G06V 2201/07* (2022.01)

(58) Field of Classification Search
CPC ...... G06V 20/10; G06V 10/44; G06V 10/507; B25J 9/163; G06K 9/629; G06K 9/6247; G06K 9/6267; G06T 7/248; G06T 7/50; G06T 7/74; G06T 2207/10016; G06T 2207/10024; G06T 2207/20056; G06T 2207/20084; G06T 2207/30201; G06T 7/246; G06T 7/262; G06T 2207/20016; H04N 5/23299; H04N 5/23219; G06N 3/0454; G06N 3/08
See application file for complete search history.

(56) References Cited

U.S. PATENT DOCUMENTS

| | | | |
|---|---|---|---|
| 2021/0158536 A1* | 5/2021 | Li | G06T 7/246 |
| 2021/0209769 A1* | 7/2021 | Chen | G06V 40/161 |
| 2021/0279475 A1* | 9/2021 | Tusch | H04L 63/0861 |

* cited by examiner

NEURAL NETWORK-BASED VISUAL DETECTION AND TRACKING METHOD OF INSPECTION ROBOT

CROSS REFERENCE TO RELATED APPLICATION

This patent application claims the benefit and priority of Chinese Patent Application No. 202011409502.1, filed on Dec. 4, 2020, the disclosure of which is incorporated by reference herein in its entirety as part of the present application.

TECHNICAL FIELD

The present disclosure relates to the technical field of intelligent robots, in particular to a neural network-based visual detection and tracking method of an inspection robot.

BACKGROUND ART

The rapid development of neural network and robot technologies makes it possible to research, develop and apply intelligent autonomous inspection robots. Traditional manual inspection requires a large amount of manpower and also requires inspectors to keep alert all the time. However, in large indoor and outdoor scenes, there are a variety of uncontrollable factors as well as uncertainties of emergencies, which exposes the inherent shortcomings about low efficiency and high risk of manual inspection. Therefore, it is quite important to develop an intelligent inspection robot capable of realizing autonomous inspection and assisting manual inspection.

For application scenes requiring high safety and high confidentiality, an intelligent inspection robot is required to not only implement inspection of stated areas, but also identify information and behaviors of people in the scenes of the areas so as to find out and stably track people with illegal or significant risk behaviors. For example, people who smoke in a no-smoking area or dress inappropriately is found out and abnormal information is reported. In this way, behaviors against safety and confidentiality can be effectively prevented in time, and more manpower and resources are saved in comparison with a way of tracing back to the source by checking the monitoring records afterwards.

According to most of the existing visual tracking methods of inspection robots, image information is acquired by a robot body and uploaded to a server for processing. This cannot make full use of an economical high-performance processor mounted in the robot, resulting in resource waste and decrease in stability and instantaneity. Meanwhile, a traditional people tracking algorithm for an inspection robot highly depends on stability of factors such as environmental illumination. The algorithm becomes ineffective when a human body has been shielded for a short time and has lower robustness on appearance deformation and quick movement of the human body.

SUMMARY

In view of this, the present disclosure aims to provide a neural network-based visual detection and tracking method of an inspection robot to make the inspection robot quickly and accurately detect specific behaviors and human targets, to improve the reliability and robustness of visual tracking of the robot.

The neural network-based visual detection and tracking method of an inspection robot provided by the present disclosure includes the following steps of:

1) acquiring dynamic environmental images by using a camera in an inspection and movement process of the robot;

2) preprocessing video images by using an embedded system mounted in the robot; where the method further includes the following steps of:

3) constructing a target detector by using a target detection algorithm, transmitting the preprocessed images to the target detector, detecting human bodies and specific behaviors in the images by the target detector, and recording information including human body depth features, human body sizes and positions of human targets with the specific behaviors;

4) constructing a target tracker by using a target tracking algorithm; invoking the target tracker to track the human targets with the specific behaviors in the images; controlling a camera gimbal of the robot to rotate an angle θ, so that a tracked object can be located at the central positions of the images all the time; starting a distance measuring sensor to acquire a distance d between the tracked object and the robot; if there are a plurality of human targets with the specific behaviors, selecting a human target with a largest detection frame and a highest behavior risk degree as the tracked object, where the behavior risk degree is taken as the priority consideration criterion;

5) controlling the robot to move along with the tracked object by using a motion controller mounted in the robot; and 6) if the tracked object has disappeared in the images for a long time, resetting the target detector and the target tracker, deleting the human targets and resetting the camera gimbal.

Further, in the step 2), the video images are preprocessed by using an embedded system mounted in the robot, and the images are compressed to 608*608-sized images in a 3-channel RGB format.

Further, in the step 3), the target detection algorithm is a yolov4 algorithm;

in the step 4), the target tracking algorithm includes:

$$\min_w \sum (f_s(x_i) - y_s)^2 + \lambda \|w\|^2$$

In the above formula: $f_s(x_i)$ is a linear regression function that makes the mean square error of a sample $x_i$ and its target $y_s$ as small as possible through a kernel correlation filter (KCF) algorithm, $\lambda$ is a regularization parameter for controlling over-fitting, and w is a classifier parameter;

the sample $x_i$ is projected to a high-dimensional feature space through a kernel function, and the classifier parameter w in ridge regression of the KCF algorithm is represented in a high-dimensional space as:

$$w = \Sigma_i \alpha_1 \varphi(x_i)$$

where $\varphi(x_i)$ is a mapping function for mapping the sample $x_i$ to the high-dimensional feature space and transforming a problem for solving w into a problem for solving a classifier coefficient $\alpha$; and the classifier coefficient $\alpha = \{\alpha_1, \alpha_2, \ldots, \alpha_i, \ldots\}$. Meanwhile, the kernel function has a form as follows:

$$k(x, x') = \varphi^T(x) \varphi(x')$$

A solution, obtained based on a least square method, of the ridge regression is subjected to Fourier transform to obtain a formula as follows:

$$F(\alpha) = \hat{\alpha} = \frac{F(y)}{\hat{k}^{xx} + \lambda}$$

where $\hat{k}^{xx}$ is a generated vector, which is the first line of a kernel matrix $K=[K_{ij}]_{n\times n}$ of the training sample $x_i$, where $K_{ij}=k(x_i,x_j)$ i, j=1, 2, ..., n, y is a set composed of all expected $y_s$ corresponding to the sample $x_i$; and $F(\alpha)$ and $F(y)$ respectively represent discrete Fourier transform of the coefficient $\alpha$ and the expected set y.

A testing sample $z=\{z_1, z_2, ..., z_n\}$ is a sample generated in a cyclic shift at a current target position, and the sample $x_i$ and a sample $z_i$ form the kernel matrix $K^z=[k(x_i,z_j)]$, where i, j=1, 2, ..., n.

The kernel matrix $K^z$ is subjected to Fourier transform to obtain a diagonal matrix; the diagonal matrix is substituted into the regression function $f_s(x_i)$ to calculate all optional sample responses formed by the testing sample $z_i$ in the following form:

$$\hat{y}_s = F^{-1}(\hat{k}^{xz}\cdot\hat{\alpha})$$

where $\hat{k}^{xz}$ is a generated vector of the kernel matrix $K^z$; 32-dimensional HOG and 11-dimensional CN features are combined to form high-dimensional new features; the high-dimensional new features are subjected to dimension reduction to form low-dimensional features $L_{down}$ through a PCA algorithm to accelerate the tracking algorithm in order to guarantee real-time operation; and the features $L_{down}$ are substituted into the formula $\hat{y}_s = F^{-1}(\hat{k}^{xz}\cdot\hat{\alpha})$ to obtain an artificial feature response $\hat{y}_s^a$;

a Densenet convolutional neural network is used to extract depth features of a human target with specific behaviors, and a convolutional output feature $L_{conv}^i$ of each layer of the Densenet is substituted into the formula $\hat{y}_s = F^{-1}(\hat{k}^{xz}\cdot\hat{\alpha})$ to obtain a depth feature response $\hat{y}_s^{ci}$ of each layer, where i=1, 2, ... n, which indicates a sequence of convolutional layers; in this way, a set $\{\hat{y}_s^{c1}\ \hat{y}_s^{c2}\ \hat{y}_s^{c3}\ \hat{y}_s^{c4}\ ...\ \hat{y}_s^{cn}\}$ of response feature maps is obtained; max $\hat{y}_s^{ck}$ represents a target predicted position of the K-th layer; since the response of the previous layer is affected by that of the latter layer, a target predicted position of the (k−1)-th layer is expressed as max $(\hat{y}_s^{c(k-1)}+\mu\hat{y}_s^{ck})$, where μ is a regularization parameter, and a depth feature response $\hat{y}_s^c = \hat{y}_s^{c1}+\mu g(\hat{y}_s^{c2}, \hat{y}_s^{c3}, ..., \hat{y}_s^{cn}, \mu)$;

the artificial feature response $\hat{y}_s^a$ and the depth feature response $\hat{y}_s^c$ are combined to determine optimal distribution of response maps, where an area corresponding to a maximum element is considered as a tracked object:

$$O_d = \max \frac{\hat{y}_s^a + \hat{y}_s^c}{2}$$

for a tracked object appearing in a previous frame, a predicted position in a current frame is determined by a maximum response map of a correlation filter based on the above-mentioned artificial feature response and depth feature response; a position p of the tracked object in the current frame is expressed as follows, where $p_l$ is a position of the tracked object in the previous frame, and W and H represent width pixels and height pixels of a map respectively:

$$p = p_l - \left(\frac{W}{2}, \frac{H}{2}\right) + O_d.$$

Further, the step 3) further includes detecting the face of the human target, and saving a successfully detected face picture and Facenet 128-dimensional face features in a database.

Further, in the step 2), the preprocessing the video images further includes dividing the acquired video images into a plurality of fixed-length frames; in the step 3), the target detection algorithm is invoked for the first fixed-length frame; and in the step 4), the target tracking algorithm is invoked for subsequent fixed-length frames to complete visual tracking of the human targets.

The present disclosure has the following beneficial effects:

1. According to the neural network-based visual detection and tracking method of an inspection robot of the present disclosure, human objects in the images are detected and positioned through a YOLOV4 algorithm; occurrence of specific behaviors can be detected without using special reference objects; visual tracking of the inspection robot is realized in combination with a tracker based on an improved KCF, and thus people with specific behaviors can be detected and positioned. In this way, the safety and standardization of a working environment are guaranteed, the reliability and robustness of visual detection and tracking of the inspection robot can be improved, and dependence of the visual tracking of the robot on environmental conditions such as illumination can be reduced.

2. According to the neural network-based visual detection and tracking method of an inspection robot of the present disclosure, the human targets and the specific behaviors in the images are detected in a robot body; the acquired image information is processed without being uploaded to a server, thereby avoiding resource waste, and improving the stability and real-time capability of visual tracking.

3. According to the neural network-based visual detection and tracking method of an inspection robot of the present disclosure, the algorithm does not become ineffective after a human body has been shielded for a short time, and has higher robustness on appearance deformation and quick movement of a human body.

DETAILED DESCRIPTION OF THE EMBODIMENTS

The present disclosure will be further described below with reference to the accompanying drawings and embodiments.

Figure 1:
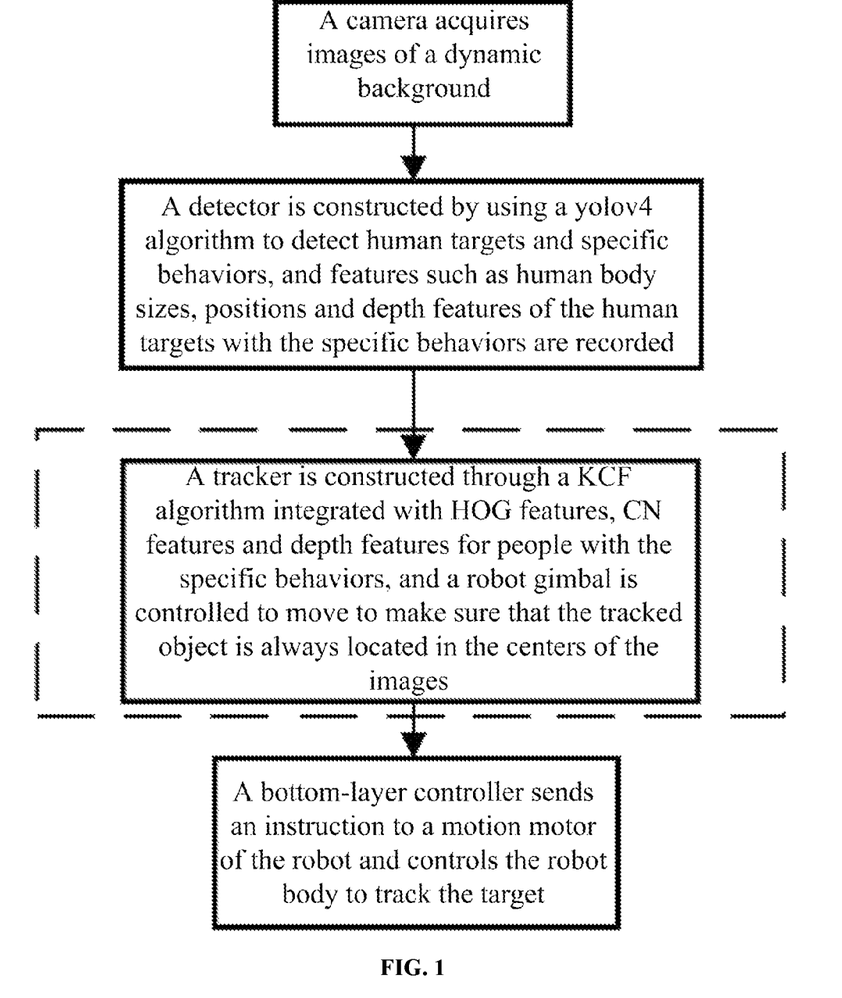
FIG. 1 is an implementation flow chart of a neural network-based visual detection and tracking method of an inspection robot.

A neural network-based visual detection and tracking method of an inspection robot of the present embodiment includes the following steps:

1) The robot acquires dynamic environmental images by using a camera in an inspection and movement process.

2) Video images are preprocessed by an embedded system mounted in the robot. In the present embodiment, specifically, the video images are preprocessed by using a Jetson Xavier NX embedded system mounted in the robot, and the images are compressed to 608*608-sized images in a 3-channel RGB format. A Ubuntu16.04 system is mounted in the embedded system, and a function in an OpenCV database is invoked for image operation through a Python language.

3) A target detector is constructed by using a target detection algorithm; the preprocessed images are transmitted to the target detector; the target detector detects human bodies and specific behaviors in the images; and information including human body depth features, human body sizes and positions of human targets with the specific behaviors are recorded. In the present embodiment, specifically, the target detector is constructed by using a yolov4 algorithm to detect human bodies and specific behavior in the images. When the specific behaviors detected, the target detector will record the information such as the human body depth features, the human body sizes and the positions of the human bodies. In addition, during specific implementation, the face of a human target can also be detected simultaneously, and a successfully detected face picture and Facenet 128-dimensional face features are saved in a database.

Figure 2:
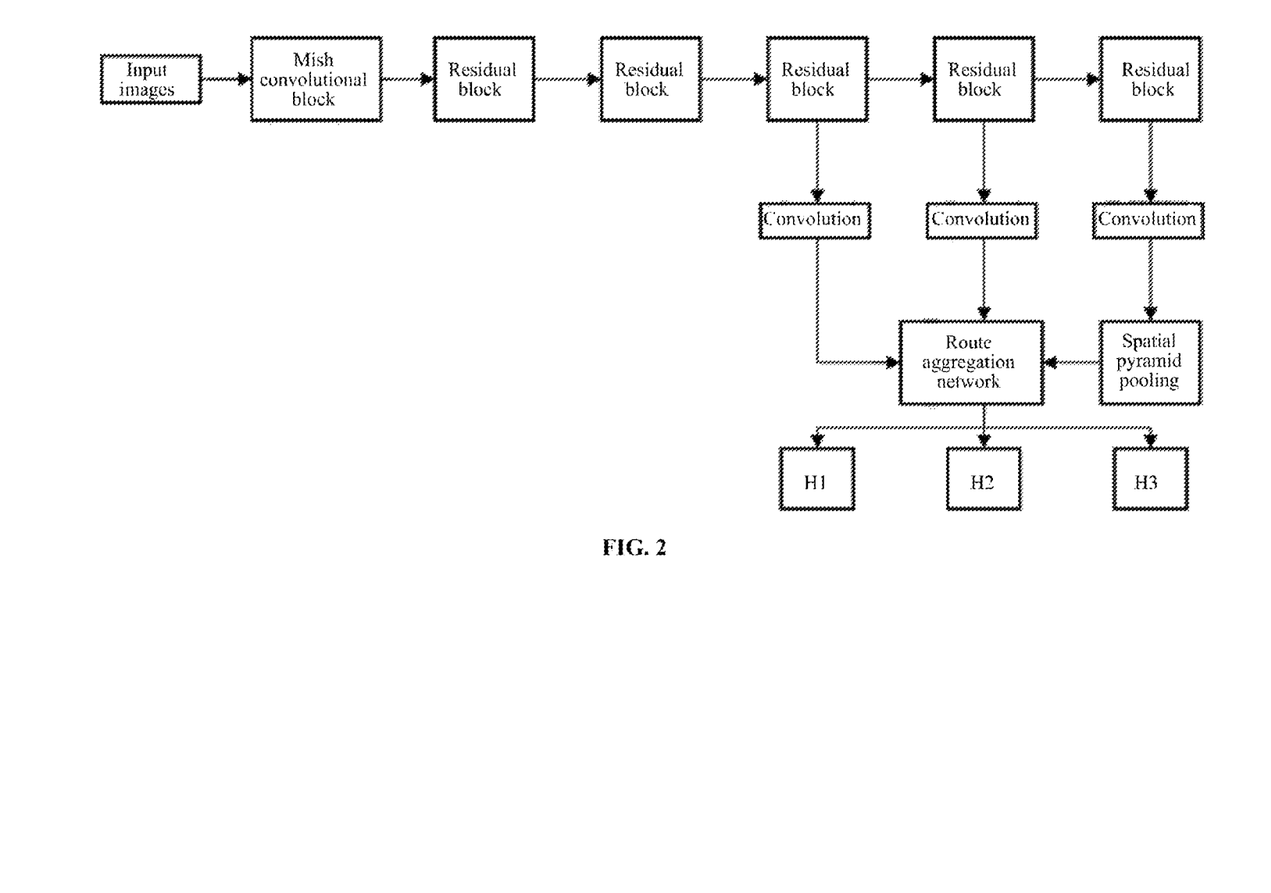
FIG. 2 is a structural diagram of YOLOv4.

During specific implementation, by using the yolov4 algorithm, off-line supervised training is implemented in a high-performance host computer by using a data set. According to the uniqueness of different specific behaviors, the specific behaviors include but are not limited to crossing fences, smoking, wearing no masks or helmets according to regulations, etc. Human bodies and different specific behaviors are manually marked one by one in a training set, and then the yolov4 algorithm is started for training. Thus, a picture with pixel dimensions of 608*608 is inputted, three feature layers will be extracted through the yolov4 algorithm, and output dimensions of the three feature layers are 19*19, 38*38 and 76*76 respectively. The three dimension features are decoded to detect and position targets with corresponding behaviors, and an obtained h5 weight file is deployed in the Jetson Xavier NX embedded system after training is completed. Meanwhile, for improving the instantaneity and the robustness of detection and tracking, the step 2) in the present embodiment further includes dividing the acquired video images into a plurality of fixed-length frames, invoking a yolov4 algorithm for the first fixed-length frame, and the target tracking algorithm is invoked for subsequent fixed-length frames to complete visual tracking of human targets.

4) A target tracker is constructed by using a target tracking algorithm; the target tracker is invoked to track a human target with the specific behaviors in the images; a camera gimbal of the robot is controlled to rotate an angle 9, so that the tracked object can be located at the central positions of the images all the time; a distance measuring sensor is started to acquire a distance d between the tracked object and the robot; the distance measuring sensor may adopt a laser sensor or an ultrasonic sensor; and if there are a plurality of human targets with the specific behaviors, the human target with a largest detection frame and a highest behavior risk degree as a tracked object, where the behavior risk degree is taken as the priority consideration criterion.

Figure 3:
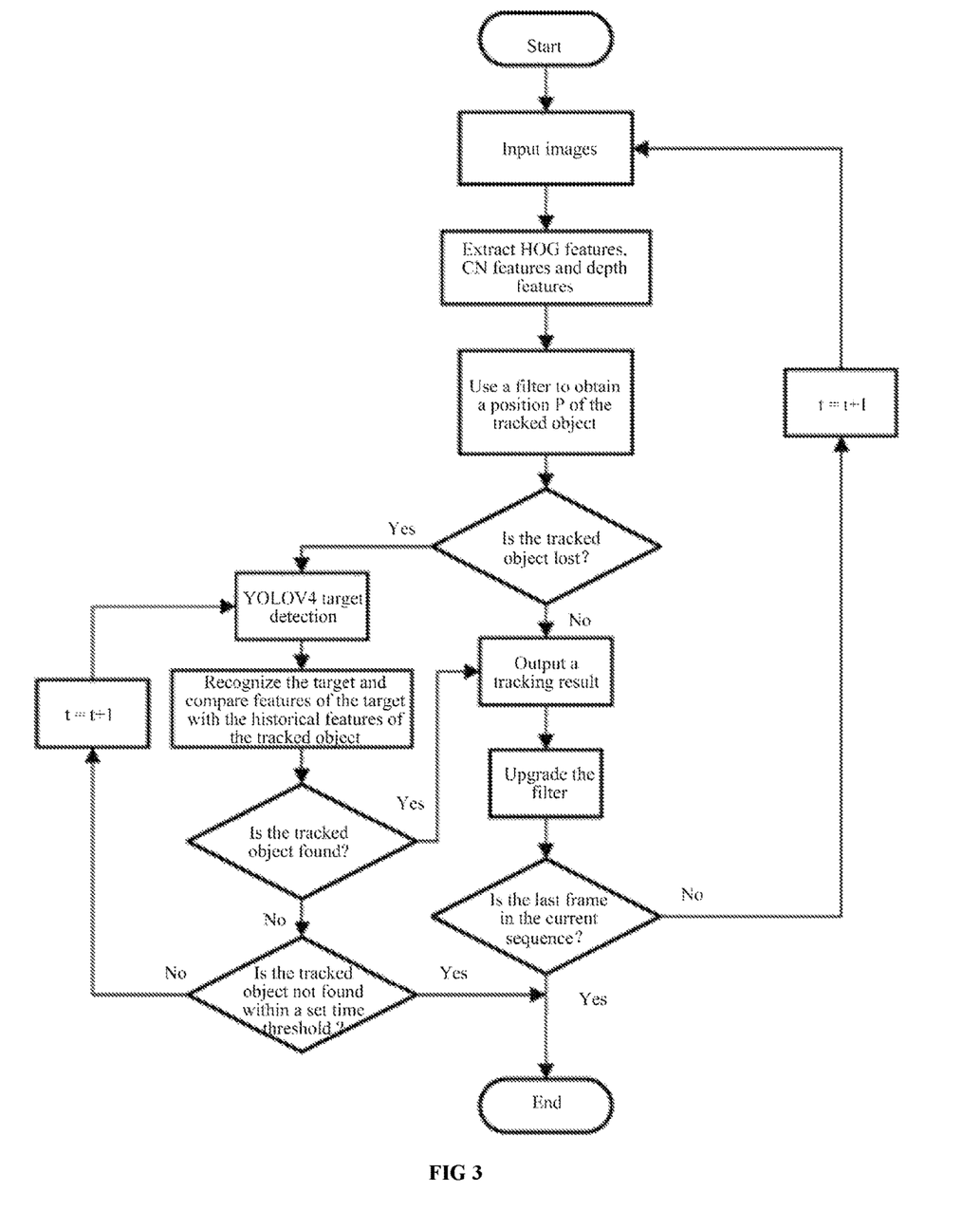
FIG. 3 is a flowchart of an improved KCF tracking algorithm.

In the step 4), the target tracking algorithm includes:

$$\min_w \sum (f_s(x_i) - y_s)^2 + \lambda \|w\|^2$$

In the above formula: $f_s(x_i)$ is a linear regression function that makes the mean square error of a sample $x_i$ and its target $y_s$ as small as possible through a kernel correlation filter (KCF) algorithm, $\lambda$ is a regularization parameter for controlling over-fitting, and w is a classifier parameter;

the sample $x_i$ is projected to a high-dimensional feature space through a kernel function, and the classifier parameter w in ridge regression of the KCF algorithm is represented in a high-dimensional space as:

$$w = \Sigma_i \alpha_i \varphi(x_i)$$

where $\varphi(x_i)$ is a mapping function for mapping the sample $x_i$ to the high-dimensional feature space and transforming a problem for solving w into a problem for solving a classifier coefficient $\alpha$; and the classifier coefficient $\alpha = \{\alpha_1, \alpha_2, \ldots, \alpha_i, \ldots\}$. Meanwhile, the kernel function has a form as follows:

$$k(x, x') = \varphi^T(x) \varphi(x')$$

A solution, obtained based on a least square method, of the ridge regression is subjected to Fourier transform to obtain a formula as follows:

$$\hat{\alpha} = \frac{F(y)}{\hat{k}^{xx} + \lambda}$$

where $\hat{k}^{xx}$ is a generated vector, which is the first line of a kernel matrix $K = [K_{ij}]_{n \times n}$ of a training sample $x_i$, where $K_{ij} = k(x_i, x_j)$ i, j=1, 2, ..., n, y is a set composed of all expected $y_s$ corresponding to the sample $x_i$; and $F(\alpha)$ and $F(y)$ respectively represent discrete Fourier transform of the coefficient $\alpha$ and the expected set y.

A testing sample $z = \{z_1, z_2, \ldots, z_n\}$ is a sample generated in a cyclic shift at a current target position, and the sample $x_i$ and a sample $z_j$ form the kernel matrix $K^z = [k(x_i, z_j)]$, where i, j=1, 2, ..., n.

The kernel matrix $K^z$ is subjected to Fourier transform to obtain a diagonal matrix; the diagonal matrix is substituted into the regression function $f_s(x_i)$ to calculate all optional sample responses formed by the testing sample $z_1$ in the following form:

$$\hat{y}_s = F^{-1}(\hat{k}^{xz} \cdot \hat{\alpha})$$

where $\hat{k}^{xz}$ is a generated vector of the kernel matrix $K^z$; 32-dimensional HOG and 11-dimensional CN features are combined to form high-dimensional new features; the high-dimensional new features are subjected to dimension reduction to form low-dimensional features $L_{down}$ through a PCA algorithm to accelerate the tracking algorithm in order to guarantee real-time operation; and the features $L_{down}$ are substituted into the formula $\hat{y}_s = F^{-1}(\hat{k}^{xz} \cdot \hat{\alpha})$ to obtain an artificial feature response $\hat{y}_s^a$;

a Densenet convolutional neural network is used to extract depth features of a human target with specific behaviors, and a convolutional output feature $L_{conv}^i$ of each layer of the Densenet is substituted into the formula $\hat{y}_s = F^{-1}(\hat{k}^{xz} \cdot \hat{\alpha})$ to obtain a depth feature response $\hat{y}_s^{ci}$ of each layer, where i=1, 2, ... n, which indicates a sequence of convolutional layers; in this way, a set $\{\hat{y}_s^{c1} \ \hat{y}_s^{c2} \ \hat{y}_s^{c3} \ \hat{y}_s^{c4} \ldots \hat{y}_s^{cn}\}$ of response feature maps is obtained; max $\hat{y}_s^{ck}$ represents a target predicted position of the K-th layer; since the response of the previous layer is affected by that of the latter layer, a target predicted position of the (k−1)-th layer is expressed as max $(\hat{y}_s^{c(k-1)} + \mu \hat{y}_s^{ck})$, where $\mu$ is a regularization parameter, and a depth feature response $\hat{y}_s^c = \hat{y}_s^{c1} + \mu g(\hat{y}_s^{c2}, \hat{y}_s^{c3}, \ldots, \hat{y}_s^{cn}, \mu)$;

the artificial feature response $\hat{y}_s^a$ and the depth feature response $\hat{y}_s^c$ are combined to determine optimal distribution of response maps, where an area corresponding to a maximum element is considered as a tracked object:

$$O_d = \max \frac{\hat{y}_s^a + \hat{y}_s^c}{2}$$

for a tracked object appearing in a previous frame, a predicted position in a current frame is determined by a maximum response map of a correlation filter based on the above-mentioned artificial feature response and depth feature response; a position p of the tracked object in the current frame is as follows: where $p_l$ is a position of the tracked object in the previous frame, and W and H represent width pixels and height pixels of a map respectively:

$$p = p_l - \left(\frac{W}{2}, \frac{H}{2}\right) + O_d.$$

During specific implementation, after a visually tracked human target has disappeared for a short time, the target detector needs to be started to detect all the targets in the images, and match recognition is conducted on the detected targets according to the historical features of the tracked object; if the detected targets are matched with the historical features of the tracked object, a tracking result will be output and the tracking process is to be continued, as shown in FIG. 3.

5) The robot is controlled to move along with the tracked object by using a motion controller mounted in the robot. During specific implementation, the motion controller can detect the distance between the robot and the tracked object according to a distance measurement module mounted on the robot, and control a walking speed of the robot to keep a tracking distance within a set range.

6) After the tracked object has disappeared in the images for a long time due to reasons such as being shielded, the target detector and the target tracker are reset, the human targets are deleted, and the position of the camera gimbal is reset.

According to the neural network-based visual detection and tracking method of an inspection robot of the present embodiment, human objects in the images are detected and positioned through a yolov4 algorithm based on a convolutional neural network; occurrence of specific behaviors can be detected without using special reference objects; and visual tracking of the inspection robot is realized in combination with a tracker based on an improved KCF. According to the neural network-based visual detection and tracking method of an inspection robot of the present disclosure, the degree of dependence of visual tracking of the robot on environmental conditions such as illumination can be lowered, people with specific behaviors can be detected and positioned, the safety and standardization of a working environment are guaranteed, and the reliability and robustness of visual tracking of the inspection robot are improved.

Finally, it should be noted that the above embodiment is merely intended to explain rather than to limit the technical solution of the present disclosure. Although the present disclosure is described in detail with reference to a preferred embodiment, those ordinarily skilled in the art should understand that all modifications or equivalent substitutions made to the technical solution of the present disclosure without departing from the spirit and scope of the technical solution of the present disclosure should be included within the scope of the claims of the present disclosure.

What is claimed is:

1. A neural network-based visual detection and tracking method of an inspection robot, comprising the following steps of:
   1) acquiring dynamic environmental images by using a camera in an inspection and movement process of the robot;
   2) preprocessing video images by using an embedded system mounted in the robot; wherein
   the visual detection and tracking method further comprises the following steps of:
   3) constructing a target detector by using a target detection algorithm, transmitting the preprocessed images to the target detector, detecting human bodies and specific behaviors in the images by the target detector, and recording information including human body depth features, human body sizes and positions of human targets with the specific behaviors;
   4) constructing a target tracker by using a target tracking algorithm; invoking the target tracker to track the human targets with the specific behaviors in the images; controlling a camera gimbal of the robot to rotate an angle θ, so that a tracked object can be located at the central positions of the images all the time; starting a distance measuring sensor to acquire a distance d between the tracked object and the robot; if there are a plurality of human targets with the specific behaviors, selecting a human target with a largest detection frame and a highest behavior risk degree as the tracked object, wherein the behavior risk degree is taken as the priority consideration criterion;
   5) controlling the robot to move along with the tracked object by using a motion controller mounted in the robot; and
   6) if the tracked object has disappeared in the images for a long time, resetting the target detector and the target tracker, deleting the human targets and resetting the camera gimbal.

2. The neural network-based visual detection and tracking method of an inspection robot according to claim 1, wherein in the step 2), the video images are preprocessed by using an embedded system mounted in the robot, and the images are compressed to 608*608-sized images in a 3-channel RGB format.

3. The neural network-based visual detection and tracking method of an inspection robot according to claim 1, wherein
   in the step 3), the target detection algorithm is a yolov4 algorithm;
   in the step 4), the target tracking algorithm comprises:

$$\min_w \sum (f_s(x_i) - y_s)^2 + \lambda \|w\|^2$$

in the above formula: $f_s(x_i)$ is a linear regression function that makes the mean square error of a sample $x_i$ and its target $y_s$ as small as possible through a kernel correlation filter (KCF) algorithm, λ is a regularization parameter for controlling over-fitting, and w is a classifier parameter;
   the sample $x_i$ is projected to a high-dimensional feature space through a kernel function, and the classifier parameter w in ridge regression of the KCF algorithm is represented in a high-dimensional space as:

$$w = \sum_i \alpha_i \varphi(x_i)$$

wherein $\varphi(x_i)$ is a mapping function for mapping the sample $x_i$ to the high-dimensional feature space and transforming a problem for solving w into a problem for solving a classifier coefficient $\alpha$; and the classifier coefficient $\alpha=\{\alpha_1, \alpha_2, \ldots, \alpha_i, \ldots\}$ wherein, the kernel function has a form as follows:

$$k(x,x')=\varphi^T(x)\varphi(x')$$

a solution, obtained based on a least square method, of the ridge regression is subjected to Fourier transform to obtain a formula as follows:

$$F(\alpha) = \hat{\alpha} = \frac{F(y)}{\hat{k}^{xx} + \lambda}$$

wherein $\hat{k}^{xx}$ is a generated vector, which is the first line of a kernel matrix $K=[K_{ij}]n\times n$ of the training sample $x_i$, wherein $K_{ij}=k(x_i,x_j)$ i,j=1, 2, ..., n, y is a set composed of all expected $y_s$ corresponding to the sample $x_i$; and $F(\alpha)$ and $F(y)$ respectively represent discrete Fourier transform of the coefficient $\alpha$ and the expected set y;

a testing sample $z=\{z_1, z_2, \ldots, z_n\}$ is a sample generated in a cyclic shift at a current target position, and the sample $x_i$ and a sample $z_j$ form the kernel matrix $K^z=[k(x_i,z_j)]$, wherein i,j=1, 2, ..., n;

the kernel matrix $K^z$ is subjected to Fourier transform to obtain a diagonal matrix; the diagonal matrix is substituted into the regression function $f_s(x_i)$ to calculate all optional sample responses formed by the testing sample $z_i$ in the following form:

$$\hat{y}_s=F^{-1}(\hat{k}^{xz}\cdot\hat{\alpha})$$

wherein $\hat{k}^{xz}$ is a generated vector of the kernel matrix $K^z$; 32-dimensional HOG and 11-dimensional CN features are combined to form high-dimensional new features; the high-dimensional new features are subjected to dimension reduction to form low-dimensional features $L_{down}$ through a PCA algorithm to accelerate the tracking algorithm in order to guarantee real-time operation; and the features $L_{down}$ are substituted into the formula $\hat{y}_s=F^{-1}(\hat{k}^{xz}\cdot\hat{\alpha})$ to obtain an artificial feature response $\hat{y}_s^a$;

a Densenet convolutional neural network is used to extract depth features of a human target with specific behaviors, and a convolutional output feature $L_{conv}^i$ of each layer of the Densenet is substituted into the formula $\hat{y}_s=F^{-1}(\hat{k}^{xz}\cdot\hat{\alpha})$ to obtain a depth feature response $\hat{y}_s^{ci}$ of each layer, wherein i=1, 2, ... n, which indicates a sequence of convolutional layers; in this way, a set $\{\hat{y}_s^{c1} \hat{y}_s^{c2} \hat{y}_s^{c3} \hat{y}_s^{c4} \ldots \hat{y}_s^{cn}\}$ of response feature maps is obtained; max $\hat{y}_s^{ck}$ represents a target predicted position of the K-th layer; since the response of the previous layer is affected by that of the latter layer, a target predicted position of the (k−1)-th layer is expressed as max($\hat{y}_s^{c(k-1)}+\mu\hat{y}_s^{ck}$), wherein µ is a regularization parameter, and a depth feature response $\hat{y}_s^c=\hat{y}_s^{c1}+\mu g(\hat{y}_s^{c2}, \hat{y}_s^{c3}, \ldots, \hat{y}_s^{cn}, \mu)$;

the artificial feature response $\hat{y}_s^a$ and the depth feature response $\hat{y}_s^c$ are combined to determine optimal distribution of response maps, wherein an area corresponding to a maximum element is considered as a tracked object:

$$O_d = \max\frac{\hat{y}_s^a + \hat{y}_s^c}{2}$$

for a tracked object appearing in a previous frame, a predicted position in a current frame is determined by a maximum response map of a correlation filter based on the above-mentioned artificial feature response and depth feature response; a position p of the tracked object in the current frame is expressed as follows, wherein $p_l$ is a position of the tracked object in the previous frame, and W and H represent width pixels and height pixels of a map respectively:

$$p = p_l - \left(\frac{W}{2}, \frac{H}{2}\right) + O_d.$$

4. The neural network-based visual detection and tracking method of an inspection robot according to claim 3, wherein the step 3) further comprises detecting the face of the human target, and saving a successfully detected face picture and Facenet 128-dimensional face features in a database.

5. The neural network-based visual detection and tracking method of an inspection robot according to claim 3, wherein in the step 2), the preprocessing the video images further comprises dividing the acquired video images into a plurality of fixed-length frames; in the step 3), the target detection algorithm is invoked for the first fixed-length frame; and in the step 4), the target tracking algorithm is invoked for subsequent fixed-length frames to complete visual tracking of human targets.

6. The neural network-based visual detection and tracking method of an inspection robot according to claim 2, wherein in the step 3), the target detection algorithm is a yolov4 algorithm;
in the step 4), the target tracking algorithm comprises:

$$\min_w \sum(f_s(x_i) - y_s)^2 + \lambda\|w\|^2$$

in the above formula: $f_s(x_i)$ is a linear regression function that makes the mean square error of a sample $x_i$ and its target $y_s$ as small as possible through a kernel correlation filter (KCF) algorithm, $\lambda$ is a regularization parameter for controlling over-fitting, and w is a classifier parameter;

the sample $x_i$ is projected to a high-dimensional feature space through a kernel function, and the classifier parameter w in ridge regression of the KCF algorithm is represented in a high-dimensional space as:

$$w = \sum_i \alpha_i \varphi(x_i)$$

wherein $\varphi(x_i)$ is a mapping function for mapping the sample $x_i$ to the high-dimensional feature space and transforming a problem for solving w into a problem for solving a classifier coefficient $\alpha$;
and the classifier coefficient $\alpha=\{\alpha_1, \alpha_2, \ldots, \alpha_i, \ldots\}$ wherein, the kernel function has a form as follows:

$$k(x,x')=\varphi^T(x)\varphi(x')$$

a solution, obtained based on a least square method, of the ridge regression is subjected to Fourier transform to obtain a formula as follows:

$$F(\alpha) = \hat{\alpha} = \frac{F(y)}{\hat{k}^{xx} + \lambda}$$

wherein $\hat{k}^{xx}$ is a generated vector, which is the first line of a kernel matrix $K=[K_{ij}]n\times n$ of the training sample $x_i$, wherein $K_{ij}=k(x_i,x_j)i,j=1, 2, \ldots, n$, y is a set composed of all expected $y_s$ corresponding to the sample $x_i$; and $F(\alpha)$ and $F(y)$ respectively represent discrete Fourier transform of the coefficient $\alpha$ and the expected set y;

a testing sample $z=\{z_1, z_2, \ldots, z_n\}$ is a sample generated in a cyclic shift at a current target position, and the sample $x_i$ and a sample $z_i$ form the kernel matrix $K^z=[k(x_i,z_j)]$, wherein $i,j=1, 2, \ldots, n$;

the kernel matrix $K_z$ is subjected to Fourier transform to obtain a diagonal matrix; the diagonal matrix is substituted into the regression function $f_s(x_i)$ to calculate all optional sample responses formed by the testing sample $z_i$ in the following form:

$$\hat{y}_s = F^{-1}(\hat{k}^{xz} \cdot \hat{\alpha})$$

wherein $\hat{k}^{xz}$ is a generated vector of the kernel matrix $K^z$; 32-dimensional HOG and 11-dimensional CN features are combined to form high-dimensional new features; the high-dimensional new features are subjected to dimension reduction to form low-dimensional features $L_{down}$ through a PCA algorithm to accelerate the tracking algorithm in order to guarantee real-time operation; and the features $L_{down}$ are substituted into the formula $\hat{y}_s = F^{-1}(\hat{k}^{xz} \cdot \hat{\alpha})$ to obtain an artificial feature response $\hat{y}_s^a$;

a Densenet convolutional neural network is used to extract depth features of a human target with specific behaviors, and a convolutional output feature $L_{conv}^i$ of each layer of the Densenet is substituted into the formula $\hat{y}_s^c = F^{-1}(\hat{k}^{xz} \cdot \hat{\alpha})$ to obtain a depth feature response $\hat{y}_s^{ci}$ of each layer, wherein $i=1, 2, \ldots n$, which indicates a sequence of convolutional layers; in this way, a set $\{\hat{y}_s^{c1} \; \hat{y}_s^{c2} \; \hat{y}_s^{c3} \; \hat{y}_s^{c4} \; \ldots \; \hat{y}_s^{cn}\}$ of response feature maps is obtained; max $\hat{y}_s^{ck}$ represents a target predicted position of the K-th layer; since the response of the previous layer is affected by that of the latter layer, a target predicted position of the (k−1)-th layer is expressed as max $(\hat{y}_s^{c(k-1)} + \mu \hat{y}_s^{ck})$, wherein $\mu$ is a regularization parameter, and a depth feature response $\hat{y}_s^c = \hat{y}_s^{c1} + \mu g(\hat{y}_s^{c2}, \hat{y}_s^{c3}, \ldots, \hat{y}_s^{cn}, \mu)$;

the artificial feature response $\hat{y}_s^a$ and the depth feature response $\hat{y}_s^c$ are combined to determine optimal distribution of response maps, wherein an area corresponding to a maximum element is considered as a tracked object:

$$O_d = \max \frac{\hat{y}_s^a + \hat{y}_s^c}{2}$$

for a tracked object appearing in a previous frame, a predicted position in a current frame is determined by a maximum response map of a correlation filter based on the above-mentioned artificial feature response and depth feature response; a position p of the tracked object in the current frame is expressed as follows, wherein $p_l$ is a position of the tracked object in the previous frame, and W and H represent width pixels and height pixels of a map respectively:

$$p = p_l - \left(\frac{W}{2}, \frac{H}{2}\right) + O_d.$$

7. The neural network-based visual detection and tracking method of an inspection robot according to claim 6, wherein the step 3) further comprises detecting the face of the human target, and saving a successfully detected face picture and Facenet 128-dimensional face features in a database.

8. The neural network-based visual detection and tracking method of an inspection robot according to claim 6, wherein in the step 2), the preprocessing the video images further comprises dividing the acquired video images into a plurality of fixed-length frames; in the step 3), the target detection algorithm is invoked for the first fixed-length frame; and in the step 4), the target tracking algorithm is invoked for subsequent fixed-length frames to complete visual tracking of human targets.

* * * * *